United States Patent [19]

Bailey

[11] Patent Number: 5,003,526
[45] Date of Patent: Mar. 26, 1991

[54] SYSTEM FOR RECORDING DIGITAL INFORMATION IN A PULSE-LENGTH MODULATION FORMAT

[75] Inventor: Jack H. Bailey, Villa Park, Calif.

[73] Assignee: Discovision Associates, Costa Mesa, Calif.

[21] Appl. No.: 499,217

[22] Filed: Mar. 16, 1990

Related U.S. Application Data

[63] Continuation of Ser. No. 782,156, Oct. 2, 1985, abandoned, which is a continuation of Ser. No. 169,238, Jul. 16, 1980, abandoned.

[51] Int. Cl.$^5$ .......................... H04N 5/76; G11B 7/00
[52] U.S. Cl. ...................................... 369/59; 358/342; 360/33.1; 360/39
[58] Field of Search ................. 369/59, 111, 124, 125, 369/102; 360/18, 24, 33.1, 32, 39; 358/335, 342; 346/76 L, 137; 375/22

[56] References Cited

U.S. PATENT DOCUMENTS

| | | | |
|---|---|---|---|
| 3,701,846 | 10/1972 | Zenzefilis | 358/128.5 |
| 4,022,986 | 5/1977 | Teer | 369/59 |
| 4,094,013 | 6/1978 | Hill | 365/234 |
| 4,161,753 | 7/1979 | Bailey et al. | 360/9 |
| 4,210,931 | 7/1980 | Bailey et al. | 358/342 |
| 4,222,072 | 9/1980 | Bailey et al. | 358/128.5 |

FOREIGN PATENT DOCUMENTS

| | | | |
|---|---|---|---|
| 346921 | 12/1978 | Australia | 369/111 |
| 2343017 | 8/1973 | Fed. Rep. of Germany | 369/111 |

OTHER PUBLICATIONS

Sony ES Review 1979, vol. 34 (Annex 1).
English translation (Annex 1A).
"A Long Play Digital Audio Disc System" by Dr. Doi, Itoh, Ogawa, Sony Audio Technology Ctr, Tokyo, Japan presented in Brussels, Belgium 1979 (Annex 2).
"Development of PCM Audio Disc System for Long Play of Two and Half Hours on One Side", Showa 53, Oct. 5th, Sony Corporation Press Release (Annex 3 and 3A).
Annex 4: Japanese newspaper-Oct. 6, 1978.
Annex 5: Japanese newspaper-Oct. 6, 1978.
Annex 6: extracted copy of "Stero Technic" of Japanese Magazine, Dec. 1978.
Annex 7: "PCM Audio Disc System" published on "Electronics" of Japanese magazine, p. 1219, Dec. 1978.
Annex 8: DAD-1X, Sony brochure.
Annex 9: extracted copy of Billboard, Nov. 18, 1978.
Annex 10: Sony ES Receiw, vol. 34, 1979.
Annex 11: English translation of Japanese article "PCM Audio Disc (Record) Player", on Television Society, pp. 1-21.

Primary Examiner—Robert L. Richardson
Attorney, Agent, or Firm—Ronald J. Clark

[57] ABSTRACT

An improved system for recording and playing back digital information in a special pulse-length modulation format on a disc-shaped record. The digital information is stored in a succession of alternating marks and spaces, both having lengths that are discretely variable in accordance with a succession of multi-bit binary code blocks.

18 Claims, 2 Drawing Sheets

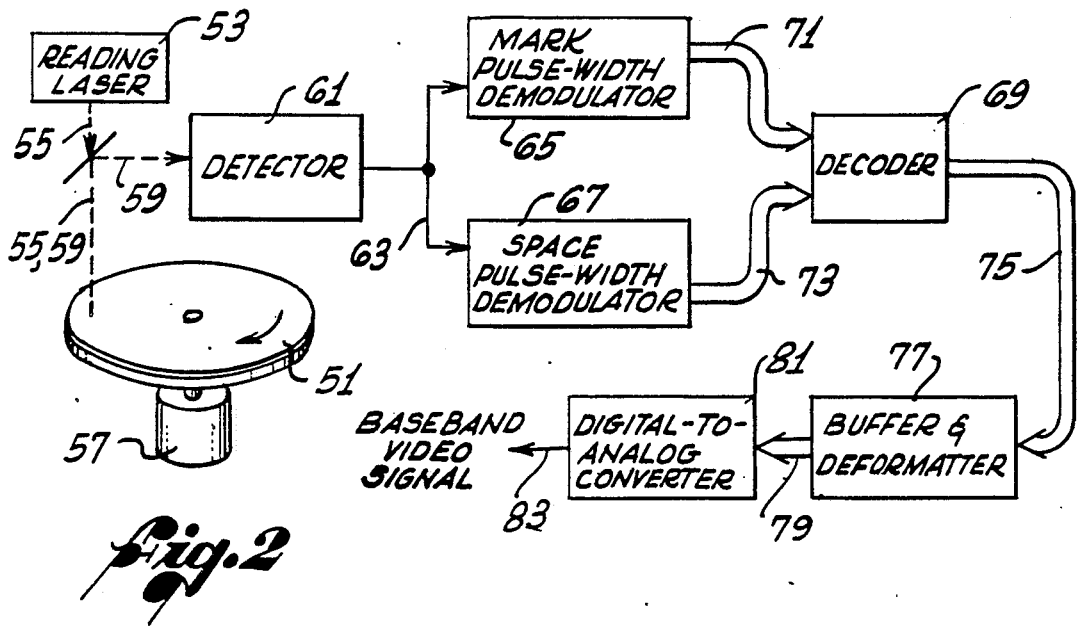

SYSTEM FOR RECORDING DIGITAL INFORMATION IN A PULSE-LENGTH MODULATION FORMAT

This application is a continuation of application Ser. No. 782,156, filed Oct. 2, 1985, which is a continuation of Ser. No. 159,238 filed July 16, 1980.

BACKGROUND OF THE INVENTION

This invention relates generally to systems for storing digital information, and, more particularly, to video disc systems for storing digital information in a pulse-length modulation format.

Video disc systems are becoming widely used for storing digital information with a high recording efficiency. The information is ordinarily recorded on the disc as a succession of spaced marks arranged in a plurality of substantially circular and concentric recording tracks, for example, a spiral pattern. One particularly efficient system has recorded the digital information in a pulse-length modulation format, in which each of the successive spaced marks has a discretely-variable length representative of a separate, multi-bit code block. The spacing between successive marks, or alternatively the spacing between the beginning edges of successive marks, is ordinarily maintained constant.

The video disc can include a glass substrate, with a thin, metallic recording layer overlaying it, and apparatus for recording the digital information on the disc ordinarily focuses a writing beam of light onto the disc, as the disc is rotated at a uniform rate, with the intensity of the beam being modulated in accordance with the digital information to be recorded. When the intensity exceeds a predetermined threshold, a non-reflective pit or mark is formed in the recording layer, whereas when the intensity does not exceed the threshold, the recording layer is not affected. Thus, the lengths of the successive, spaced marks correspond to the time duration the intensity of the focused beam exceeds this threshold.

The recorded digital information is recovered from replicas of the recorded video disc by scanning it with a reading beam of light having a uniform intensity, to produce a reflected beam having an intensity modulated by the recorded pattern of spaced marks. The length of time the intensity of the reflected beam exceeds a predetermined level is then measured to determine the length of the corresponding mark and thus the particular binary code block it represents.

Although this prior pulse-length modulation technique has proven effective in recording digital information with a relatively high recording efficiency, there is still a need for a system for recording digital information with an even higher efficiency. The present invention fulfills this need.

SUMMARY OF THE INVENTION

The present invention is embodied in a system for recording and playing back digital information on a record medium, in which the information is stored in a succession of spaced marks of discretely-variable lengths. The length of each mark is representative of a separate one of a succession of multi-bit binary code blocks. In accordance with the invention, the spaces between successive marks also have discretely-variable lengths representative of separate blocks in the succession of code blocks. Digital information is thereby recorded on the record medium with a yet higher recording efficiency.

More particularly, the present invention has particular utility in a video disc system in which a video signal is recorded on a disc-shaped record in a succession of substantially circular and concentric recording tracks. The recording apparatus functions initially to digitize the video signal and to compress the digitized signal, using known data compression techniques. The digitized signal is then arranged in a succession of code blocks of the same or mixed lengths, and a binary modulation signal is formed having transitions in state determined in accordance with the successive code blocks. In the preferred embodiment, each code block includes four binary bits, and the successive states of the modulation signal have sixteen possible discrete durations.

The modulation signal is coupled to a light intensity modulator, which modulates the intensity of a writing beam such that the intensity is alternately greater than and less than a predetermined threshold for time durations corresponding to the succession of multi-bit code blocks. The intensity-modulated beam is focused onto the record, as the record is rotated at a prescribed rate, to form corresponding microscopic pits or marks in a prescribed pattern. Using conventional techniques, the record can then be used to produce video disc replicas.

The recorded digital information is played back from disc replicas by scanning the successive tracks with a reading beam of light having a substantially uniform intensity. This produces a reflected (or transmitted) beam having an intensity modulated by the recorded pattern of alternating marks and spaces. The playback apparatus measures the time durations of the successive marks and spaces and determines the particular code blocks each represents. After de-compressing the succession of detected code blocks, the original analog video signal can be re-created.

In the preferred embodiment, each of the successive recording tracks is used to record a separate video frame. Since the special pulse-length modulation format results in a recorded pattern of marks and spaces having a variable length, however, it is usually the case that less than an entire track is required to record each video frame. When this occurs, the remainder of the track is occupied by alternating marks and spaces representative of a prescribed filler code.

Other aspects and advantages of the present invention will become apparent from the following description of the preferred embodiment, taken in conjunction with the accompanying drawings, which disclose, by way of example, the principles of the invention.

BRIEF DESCRIPTION OF THE DRAWINGS

FIG. 2 is a simplified block diagram of playback apparatus in accordance with the present invention, for recovering the digitized video signal stored on the video disc in the special pulse-length modulation format;

FIG. 4 is a table showing the prescribed lengths for the sucessive marks (and spaces) corresponding to each of the plurality of possible 4-bit code blocks being recorded.

DESCRIPTION OF THE PREFERRED EMBODIMENT

Figure 1:
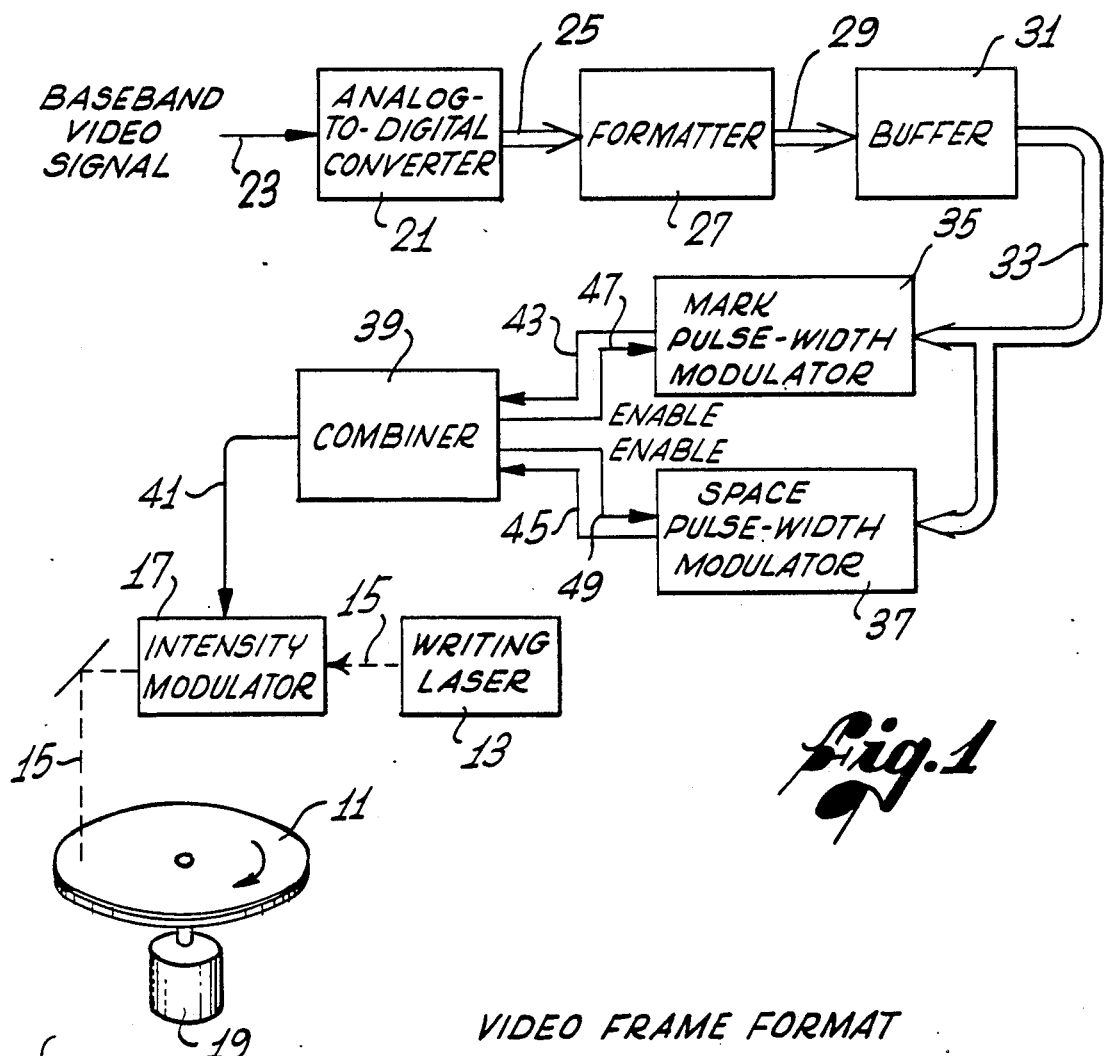
FIG. 1 is a simplified block diagram of recording apparatus in accordance with the present invention, for recording a digitized video signal on a video disc, in a special pulse-length modulation format.

Referring now to the drawings, and particularly to FIG. 1, there is shown recording apparatus for recording a digitized video signal on a disc-shaped record 11. The apparatus includes a writing laser 13 for producing a writing beam of light 15 having a substantially uniform intensity, and an intensity modulator 17 for modulating the intensity of the beam in accordance with a digital modulation signal to be recorded. The apparatus further includes a radially-movably objective lens (not shown) for focusing the intensity-modulated beam onto the record, and a spindle motor 19 for rotating the record at a prescribed, uniform rate (e.g., 1800 r.p.m.). The focused beam thereby forms a succession of substantially circular and concentric recording tracks in the record.

The record 11 includes a glass substrate with a metallic recording layer overlaying it, and the focused beam forms a microscopic pit in the recording layer whenever its intensity exceeds a predetermined threshold. The intensity is modulated to be alternately greater and less than this threshold, in accordance with the digital modulation signal to be recorded, so that a corespond- ing succession of spaced pits or marks is formed in the. record.

In accordance with the invention, the digitized video signal is recorded in the record 11 in a special pulse-length modulation format, in which both the successive marks and the spaces between successive marks have discretely-variable lengths representative of a succession of multi-bit binary code blocks. Digital information is thereby recorded on the record with an improved recording efficiency.

More particularly, the recording apparatus of FIG. 1 includes an analog-to-digital converter 21, for sampling a baseband video signal input on line 23 and converting it to a corresponding digital signal. This digital signal is coupled over lines 25 to a formatter 27, for removal of vertical and horizontal sync signals, compression- of the digital information, and formatting of the compressed data into successive four-bit code blocks. These successive code blocks are transfered over lines 29 to a suitable storage buffer 31, which outputs the blocks, one by one over lines 33, to a MARK pulse-width modulator 35 and a SPACE pulse-width modulator 37. The two pulse-width modulators operate, in an alternating fashion, to produce output pulses having discretely-variable time durations corresponding to the particular code blocks applied to their respective input terminals. The buffer 31 must have sufficient storage capacity to store a predetermined number of 4-bit code blocks, since the blocks are input at a substantially uniform rate but are output at a variable rate determined by the particular information the code blocks contain.

FIG. 4 is a table showing one suitable relationship between the sixteen possible 4-bit code blocks and the time durations for the corresponding pulses output by the two pulse-width modulators 35 and 37. It will be observed that the possible pulse lengths vary in uniform steps between a minimum length of 1.0L and a maximum length of 2.5L. An alternative relationship between the sixteen possible code blocks and the corresponding pulse durations is provided in a copending and commonly-assigned application for U.S. Pat., Ser. No. 974,183, filed in the name of Jack H. Bailey and entitled "Video Player/Recorder With Non-Linear Mark Length Modulation".

The recording apparatus of FIG. 1 further includes a combiner device 39 for producing the modulation signal coupled over line 41 to the intensity modulator 17, in accordance with the successive pulse-length modulated pulses received over lines 43 and 45 from the MARK and SPACE modulators 35 and 37, respectively. The combiner also controls the timing of the MARK and SPACE modulators by providing ENABLE signals over lines 47 and 49, respectively, initiating operation of each modulator immediately after the previous output pulse from the other modulator has terminated. The modulation signal output by the combiner on line 41 is in a logical "one" state whenever the MARK modulator 35 outputs a pulse, and in the logical "zero" state whenever the SPACE modulator 37 outputs a pulse. The desired pattern of alternating marks and spaces, representative of the successive four-bit code blocks, is thereby formed in the record 11.

Figure 3:
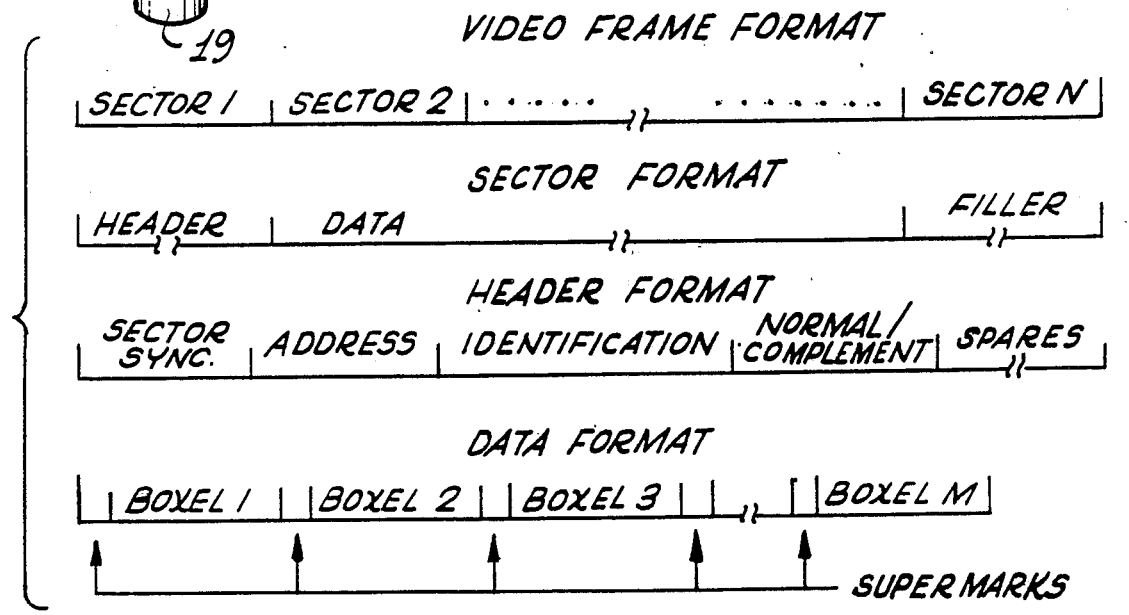
FIG. 3 is a schematic diagram illustrating the format of the data on the video disc.

In the preferred embodiment, each of the successive recording tracks in the record 11 records the digital information for a single video frame. As shown in FIG. 3, each track includes N sectors, and each sector includes a header portion, a data portion, and a filler portion of variable length. A fixed amount of data is included in each data portion, but since each mark and space are variable in length, the length of the entire data portion is likewise variable. The filler portion is therefore usually necessary. In the preferred embodiment, the filler code. comprises a special sequence of marks and spaces that can be used in calibrating apparatus for playing back the recorded information. Both the header and filler portions of each sector are generated by the formatter 27 (FIG. 1), which includes registers for storing data representative of the current frame and sector number and of the particular location in the sector currently being recorded.

FIG. 3 depicts the header portion of each sector to include a synchronizing code, a sector address code, an identification code indicating the character of the data (e.g., video, audio, etc.), a normal/ complement code. and spares for permitting expansion of any of the previous codes. The normal/complement code is used as a special means for minimizing the length of the data in each sector. As previously mentioned, each sector includes a fixed amount of data, but is variable in length, in accordance with the particular code blocks being recorded. If it is determined by the formatter 27 (FIG. 1) that the required track length to record a particular sector of data exceeds a predetermined average value, then the formatter outputs the complement of each code block for recording instead, and modifies the normal/-complement code in the corresponding header, accordingly. In this manner, the maximum track length required to store the data in any sector corresponds to the recording of marks and spaces that are all of average length, i.e., that correspond to the code blocks "0111" or "1000".

FIG. 3 also depicts the format of the data portion of each sector. It will be observed that the data includes M successive boxels, each preceded by a special supermark code, for synchronization and re-initialization. In the preferred embodiment, each boxel corresponds to an $8 \times 8$ matrix derived from a segment of the video frame.

FIG. 2 depicts apparatus for playing back a video disc replica 51 of the recorded record 11 of FIG. 1. The apparatus includes a reading laser 53 for producing a reading beam of light 55 having a substantially uniform intensity. This beam is focused onto the disc 51 by a radially-movable lens (not shown) as the disc is rotated at a uniform rate by a spindle motor 57. This produces a reflected beam 59 that is modulated in intensity in accordance with the recorded pattern of marks on the disc. The apparatus then detects the modulated beam and measures the lengths of the successive pulse-length modulated marks and spaces, to determine the corresponding 4-bit code blocks they represent. The original baseband video signal is thereafter reconstructed.

More particularly, the playback apparatus of FIG. 2 includes a detector 61 for detecting the modulated intensity of the reflected beam 59 and producing a corresponding electrical signal. This signal is coupled over line 63 to a MARK pulse-width demodulator 65 and a SPACE pulse-width demodulator 67, which measure the lengths of the successive marks and spaces, respectively, and determine the particular code blocks they represent. Each demodulator can conveniently include a linear ramp generator that is initiated and terminated by the detected edges of each mark (or space), along with an analog-to-digital converter for converting the peak value of the ramp to the corresponding four-bit code block. The apparatus further includes a decoder 69 for interleaving the successive four-bit code blocks supplied on lines 71 and 73 from the MARK and SPACE demodulators 65 and 67, respectively.

The sequence of code blocks is coupled over lines 75 from the decoder 69 to a buffer and deformatter device 77, which de-compresses the data using conventional techniques, converting it back to substantially its original digital format. Additionally, the deformatter inserts conventional digitized vertical and horizontal sync signals into the decompressed video data. The deformatter then produces a real-time digital video signal for coupling over lines 79 to a digital-to-analog converter 81, which reconstructs the original analog baseband video signal for output on line 83. The buffer and deformatter device 77 must include sufficient memory capacity to store a predetermined portion of the successive incoming code blocks, which are received from the decoder 69 at a variable rate determined by on the particular information the codeblocks contain, while the information is being output in a substantially real-time fashion.

It will be appreciated from the foregoing description that the present invention provides an improved system for recording and playing back digital information on a disc-shaped record. The information is stored in a succession of spaced marks, with the lengths of both the marks and the spaces between successive marks being discretely variable in accordance with a succession of multi-bit code blocks. The digital information is thereby stored with an improved recording efficiency.

Although the present invention has been described in detail with reference to its presently preferred embodiment, it will be understood by those of ordinary skill in the art that various modifications can be made without departing from the spirit and scope of the invention. Accordingly, it is not intended that the invention be limited, except as by the appended claims.

I claim:

1. A method for recording digital information on a record medium, the digital information being derived from a succession of binary bits, the method comprising steps of:

grouping the binary bits into a succession of code blocks, each code block representing a prescribed number of binary bits; and recording the succession of code blocks on the record medium as a corresponding succession of alternating marks and spaces, the lengths of the successive marks and spaces being discretely variable in accordance with separate blocks in the succession of code blocks;

whereby the digital information is recorded on the record medium with high efficiency.

2. A method as defined in claim 1, wherein the code blocks formed in the step of grouping each include the same number of binary bits.

3. In a system for recording digital information on a record medium in the form of a succession of spaced marks, the lengths of the successive marks being modulated in discrete steps in accordance with a succession of corresponding binary code blocks, an improvement comprising:

means for modulating the lengths of the spaces between the successive marks, in accordance with alternate blocks of the succession of binary code blocks, whereby each of the successive marks and spaces has a length representative of a separate code block and the digital information is recorded on the record medium with an increased efficiency.

4. Playback apparatus for recovering digital information stored on a record medium, the information being stored in a succession of spaced marks, each mark and each space between successive marks having a discretely-variable length representative of a separate multi-bit binary code block, the apparatus comprising:

means for scanning the record medium to produce a playback signal that varies in accordance with the stored pattern of spaced marks; and detection means responsive to the playback signal for detecting the lengths of the successive marks and spaces and for providing an output signal representative of the particular code block to which each corresponds.

5. A disc-shaped record medium for storing digital information in a succession of substantially circular and concentric recording tracks, the digital information being derived from a succession of multi-bit binary code blocks, wherein each recording track includes a succession of alternating marks and spaces, the lengths of the successive marks and spaces being modulated in discrete steps in accordance with separate code blocks.

6. A disc-shaped record medium as defined in claim 5, wherein:

each code block includes four binary bits; and each mark and each space between successive marks has one of sixteen possible discrete lengths, representative of the corresponding four-bit code block.

7. A disc-shaped record medium as defined in claim 5, wherein each recording track stores a prescribed amount of digital information, and when less than an entire track is required to record the information, the remainder of the track is occupied by alternating marks and spaces representative of a prescribed filler code.

8. A method for recording digital information along a plurality of recording tracks on a record medium, the digital information being derived from a succession of binary bits, comprising:

grouping the binary bits into a succession of code blocks, each code block representing a prescribed number of binary bits; and recording the succession of code blocks along the tracks on the record medium as a corresponding succession of alternating marks and spaces, the lengths of each of the successive marks and spaces being discretely variable in accordance with separate blocks in the succession of code blocks, and the length of the recorded digital information along any particular recording track being variable relative to the length of the recorded digital data information along any other recording track on the record medium, whereby the digital information is recorded on the record medium with high efficiency.

9. The method of claim 8, further including, after grouping the binary bits, the step of temporarily storing the succession of code blocks in a storage buffer for subsequent outputting from the storage buffer at a predetermined rate, and thereafter recording the succession of code blocks outputted from the storage buffer.

10. The method of claim 8, wherein the recording of code blocks on the record medium includes modulating a writing beam of light in accordance with said digital information and focussing the modulated writing beam onto the surface of said record medium, the record medium including a surface layer having a predetermined threshold above which a mark is recorded on the surface layer and below which the surface layer is unaffected, thereby leaving a space between successive marks, the lengths of the successive spaced marks corresponding to the time duration that the intensity of the beam exceeds the threshold of the record medium, the succession of code blocks being recorded along the recording tracks of the record medium, and the length of the recorded digital information along any particular recording track being variable relative to the length of the recorded digital information along any other recording track on the record medium.

11. A system of recording digital information in the form of a succession of binary coded blocks each representing a prescribed number of binary bits, along a plurality of recording tracks on a record medium in the form of a succession of spaced marks, the lengths of the successive marks being discretely modulated in accordance with the first alternate ones of said blocks, the system including means for modulating a writing beam of light in accordance with said digital information and means for focussing the modulated writing beam onto the surface of the record medium, the record medium including a surface layer having a predetermined threshold above which a mark is recorded in the surface layer and below which the surface layer is unaffected thereby leaving a space between successive marks, the lengths of the successive spaced marks corresponding to the time duration that the intensity of the beam exceeds the threshold of the record medium, characterized in that: there are provided means for modulating the lengths of the spaces between the successive marks, in accordance with second alternate ones of said blocks; each of the successive marks and spaces has a length representative of a separate code block; and the length of the recorded digital information along any particular recording track is variable relative to the length of the recorded digital information along any other recording track on the record medium; whereby the digital information is recorded on the record medium with an increased efficiency.

12. A system for recording digital information in the form of a succession of binary coded blocks on a record medium in the form of a succession of spaced marks, the system including:
means for temporarily storing said successive code blocks in a storage buffer for subsequent outputting from said storage buffer at a predetermined rate, each said code block representing a predescribed number of binary bits, the lengths of the successive marks being discretely modulated in accordance with first alternate ones of said blocks outputted from said buffer; and
means for modulating the lengths of the spaced between the successive marks, in accordance with second alternate ones of said blocks ouputted from said buffer, each of the successive marks and spaces having a discrete length representative of a separate code block, whereby the digital information is recorded on the record medium with an increased efficiency.

13. A system of recording digital information in the form of a succession of binary coded blocks each representing a prescribed number of binary bits, along a plurality of recording tracks on a record medium in the form of a succession of spaced marks, the lengths of the successive marks being discretely modulated in accordance with the first alternate ones of said blocks, characterized in that: there are provided means for modulating the lengths of the spaces between the successive marks, in accordance with second alternate ones of said blocks; each of the successive marks and spaces has a length representative of a separate code block; and the length of the recorded digital data information along any particular recording track is variable relative to the length of the recorded digital information along any other recording track on the record medium; whereby the digital information is recorded on the record medium with the increased efficiency.

14. Playback apparatus for recording digital information stored along a plurality of recording tracks on a record medium, the information being stored in a succession of spaced marks, each mark and each space between successive marks having a discretely-variable length representative of a separate binary code block representing a prescribed number of binary bits, characterized in that the length of the stored digital information along any particular recording track is variable relative to the length of the recorded digital information along any particular recording track is variable relative to the length of the recorded digital information along any other recording track on the record medium; and by means for scanning the record medium to produce a playback signal that varies in accordance with the stored pattern of spaces and marks along the tracks; and detection means responsive to the playback signal for detecting the lengths of the successive marks and spaces and for providing an output signal representative of the particular code block to which each corresponds.

15. The playback apparatus of claim 4, further including means for interleaving the code blocks representing the marks with the code block representing the spaces.

16. The playback apparatus of claim 4, further including means for temporarily storing said output signal in a storage buffer for subsequent outputting from said storage buffer at a predetermined rate.

17. A disc-shaped record medium for storing digital information in a succession of substantially circular and concentric recording tracks, wherein each recording track includes a succession of alternating marks and spaces representing segmented digital information, each segment including a segment address code portion, a synchronization code portion, and a data portion, the lengths of the successive marks and spaces being modulated in accordance with the information to be recorded, characterized in that; the data portion of the stored digital information contained in any segment of any particular recording track is variable in length relative to the length of the data portion of the stored digital information contained in a segment of any other recording track on the record medium; and the digital information is derived from a succession of multi-bit binary code blocks converted to corresponding output pulses having discretely-variable time durations, wherein the length of the successive marks and spaces are modulated in discrete steps in accordance with the discrete lengths of corresponding ones of said output pulses.

18. A disc-shaped record medium for storing digital information in a succession of substantially circular and concentric recording tracks, wherein each recording track includes a succession of alternating marks and spaces representing segmented digital information along the track, each segment including a header portion and a data portion, the lengths of the successive marks and spaces being modulated in accordance with the information to be recorded, characterized in that: the data portion of the stored digital information contained in any segment of any particular recording track is variable in length relative to the length of the data portion of the stored digital information contained in a segment of any other recording track on the record medium; and the digital information is derived from a succession of multi-bit binary code blocks converted to corresponding output pulses having discretely-variable time durations, wherein the lengths of the successive marks and spaces are modulated in discrete steps in accordance with the discrete lengths of corresponding ones of said output pulses.

* * * * *

UNITED STATES PATENT AND TRADEMARK OFFICE
CERTIFICATE OF CORRECTION

PATENT NO. : 5,003,526
DATED : March 26, 1991
INVENTOR(S) : Jack H. Bailey

It is certified that error appears in the above-identified patent and that said Letters Patent is hereby corrected as shown below:

Column 1, line 8, cancel "159,238" and substitute
--169,238--.

Column 8, line 37, cancel "recording" and substitute
--recovering--.

Column 8, lines 47 and 48, cancel "any particular...
information along".

Signed and Sealed this

First Day of December, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 5,003,526
DATED : March 26, 1991
INVENTOR(S) : Jack H. Bailey

It is certified that error appears in the above-indentified patent and that said Letters Patent is hereby corrected as shown below:

On the title page, Item [56] Foreign Documents cancel "Australia" and substitute --Austria--.

Signed and Sealed this

Eighteenth Day of January, 1994

BRUCE LEHMAN

Attest:

*Attesting Officer*

*Commissioner of Patents and Trademarks*